(12) United States Patent
Uemura et al.

(10) Patent No.: US 9,275,616 B2
(45) Date of Patent: Mar. 1, 2016

(54) ASSOCIATING MUSICAL SCORE IMAGE DATA AND LOGICAL MUSICAL SCORE DATA

(71) Applicant: YAMAHA CORPORATION, Hamamatsu-shi, Shizuoka-ken (JP)

(72) Inventors: Norihiro Uemura, Hamamatsu (JP); Dan Sasai, Hamamatsu (JP); Motoichi Tamura, Hamamatsu (JP)

(73) Assignee: YAMAHA CORPORATION (JP)

( * ) Notice: Subject to any disclaimer, the term of this patent is extended or adjusted under 35 U.S.C. 154(b) by 0 days.

(21) Appl. No.: 14/573,237

(22) Filed: Dec. 17, 2014

(65) Prior Publication Data

US 2015/0179156 A1 Jun. 25, 2015

(30) Foreign Application Priority Data

Dec. 19, 2013 (JP) .................................. 2013-263047

(51) Int. Cl.
  *A63H 5/00* (2006.01)
  *G10H 1/00* (2006.01)
  *G06K 9/00* (2006.01)

(52) U.S. Cl.
  CPC .......... *G10H 1/0008* (2013.01); *G06K 9/00476* (2013.01)

(58) Field of Classification Search
  CPC .................... G10H 1/0008; G10H 9/00476
  USPC ......................................................... 84/609
  See application file for complete search history.

(56) References Cited

U.S. PATENT DOCUMENTS

| 5,952,597 | A | 9/1999 | Weinstock et al. |
| 8,442,325 | B2* | 5/2013 | Hong et al. ................... 382/190 |
| 2007/0012165 | A1* | 1/2007 | Noh et al. ........................ 84/616 |
| 2012/0160077 | A1 | 6/2012 | Nakano et al. |
| 2013/0284000 | A1 | 10/2013 | Sasaki |

FOREIGN PATENT DOCUMENTS

| JP | 2012-73769 A | 4/2012 |
| JP | 2012-138009 A | 7/2012 |

OTHER PUBLICATIONS

Extended European Search Report issued in EP14197325.5, mailed Apr. 30, 2015.

(Continued)

*Primary Examiner* — Jianchun Qin
(74) *Attorney, Agent, or Firm* — Rossi, Kimms & McDowell LLP

(57) ABSTRACT

The method analyzes, on the basis of the musical score image data, an image note sequence that is a time series of a plurality of notes included in the image of a musical score of a given music piece, acquires, on the basis of a logical musical score data, a logical note sequence that is a time series of a plurality of notes included in the musical score of the given music piece, and then identifies correspondence relationship between the individual notes in the image note sequence and the individual notes in the logical note sequence by comparing the image note sequence and the logical note sequence. Further, the method displays the musical score image of the given music piece on the basis of the musical score image data, and controls a display state of the displayed image of the musical score by use of the identified correspondence relationship.

21 Claims, 4 Drawing Sheets

(56) References Cited

OTHER PUBLICATIONS

Arifi, "Algorithmen zur Synchronisation von Musikdaten im Partitur-, MIDI-, and PCM-Format", Dissertation / PhD-thesis, Jan. 1, 2002, XP055182435. English translation of text passages indicated in European Search Report mailed Apr. 30, 2015 for EP14197325.5 provided. Cited in NPL 1.

Kurth et al., "Automated Synchronization of Scanned Sheet Music with Audio Recordings", Jan. 1, 2007, pp. 261-266, Proceedings of the 8th International Conference on Music Information Retrieval, Vienna, Austria. XP055182381. Cited in NPL 1.

* cited by examiner

F I G. 7
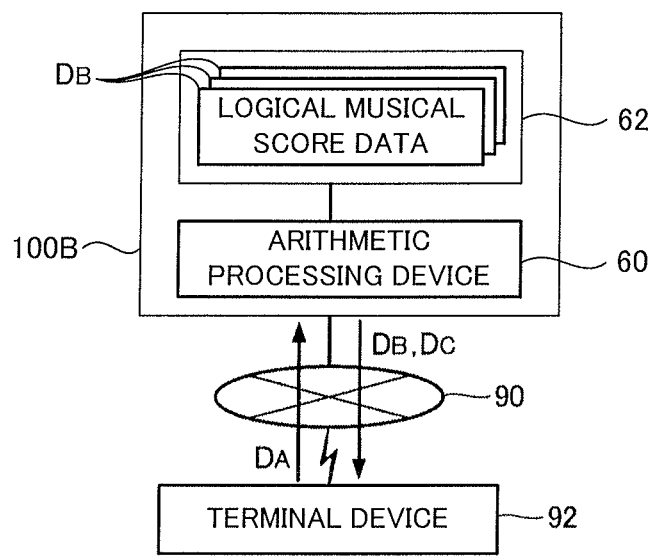
F I G. 8

ASSOCIATING MUSICAL SCORE IMAGE DATA AND LOGICAL MUSICAL SCORE DATA

BACKGROUND

The present invention relates generally to techniques for analyzing a musical score and more particularly to a technique for associating musical score image data and logical musical score data.

A musical score of a given music can be expressed not only as data indicative of a visible image (such data will hereinafter be referred to as "musical score image data") of the musical score but also as data describing content of the musical score as logical music information by use of a particular data description language (such data will hereinafter be referred to as "logical musical data"). A typical example of the musical score image data is a PDF file (Portable Document File), and a typical example of the logical musical data is a file of the MusicXML (eXtensible Markup Language) format.

Because the musical score image data expresses a musical score as an image, it is difficult for a computer to recognize content, such as musical symbol, of the musical score accurately and in detail as computer-interpretable information, although the musical score can be displayed in a form (layout) exactly as intended by a creator. Japanese Patent Application Laid-open Publication Nos. 2012-073769 and 2012-138009, for example, disclose musical score recognition techniques for recognizing musical symbols by analyzing an image of a musical score; actually however, these disclosed musical score recognition technique would suffer from a problem of recognition errors. The logical musical score data, on the other hand, expresses a musical score as logical information, and thus, the logical musical score data has a character that a form of display of the musical score varies (i.e., reproduction reliability of a layout of the musical score) depending on an algorithm of a rendering engine that generates an image from the logical musical score, although the logical musical score data allows content, such as musical symbols, of the musical score to be grasped accurately and in detail.

As seen from the foregoing, the musical score image data and the logical musical score data have both advantages and disadvantages. If such musical score image data and logical musical score data can be used in combination to make up for each other's disadvantages, it may be possible to realize diversified use of a musical score. For example, it may be possible to realize use of a musical score where music piece reproduction (automatic performance) using the logical musical score data and musical score display using the musical score image data are performed in parallel with each other, and where a current reproduced position of the music piece in the musical score is displayed in a highlighted manner. However, because note-by-note correspondence relationship is unclear between the musical score indicated by the musical score image data and the musical score indicated by the logical musical score data, using the musical score image data and logical musical score data in combination is difficult in reality.

SUMMARY OF THE INVENTION

In view of the foregoing prior art problems, it is an object of the present invention to realize use of a musical score based on a combination of musical score image data and logical musical score data.

In order to accomplish the above-mentioned object, the present invention provides an improved computer-implemented method for analyzing a musical score on the basis of musical score image data representing an image of a musical score of a given music piece and logical musical score data logically representing the musical score of the given music piece, which comprises: analyzing, on the basis of the musical score image data, an image note sequence that is a time series of a plurality of notes included in the image of the musical score of the given music piece; acquiring, on the basis of the logical musical score data, a logical note sequence that is a time series of a plurality of notes included in the musical score of the given music piece; and identifying correspondence relationship between the individual notes in the image note sequence and the individual notes in the logical note sequence by comparing the image note sequence and the logical note sequence.

According to the present invention arranged in the aforementioned manner, the correspondence relationship between the individual notes in the image note sequence identified from the musical score image represented by the musical score image data and the individual notes in the logical note sequence represented by the logical musical score data is identified by comparing the image note sequence and the logical note sequence. Thus, the present invention can realize diversified use of the musical score using a combination of the musical score image data and the logical musical score data.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 7 is a diagram explanatory of how individual notes of a chord are located close to each other in a musical score image; and FIG. 8 is a block diagram showing an example overall setup of a musical score analysis apparatus constructed to embody a method and apparatus according to a second embodiment of the present invention.

DETAILED DESCRIPTION OF THE INVENTION

First Embodiment

Figure 1A:
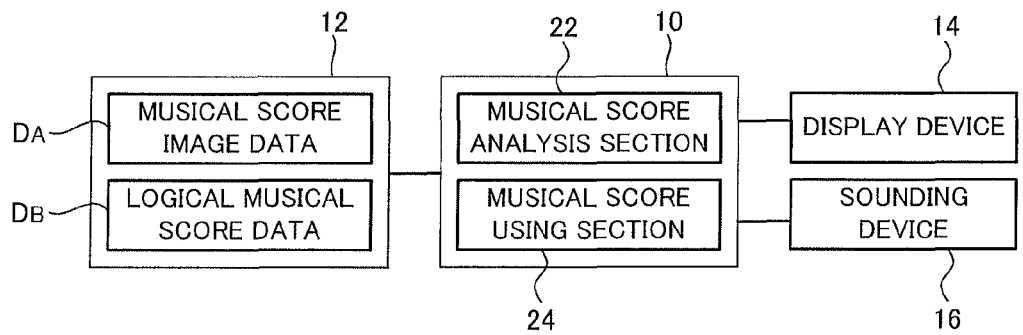
FIG. 1A is a block diagram showing an example overall setup of a musical score analysis apparatus constructed to embody a method and apparatus according to a first embodiment of the present invention.

FIG. 1A is a block diagram showing an example overall setup of a musical score analysis apparatus 100A constructed to embody a method and apparatus according to a first embodiment of the present invention. The musical score analysis apparatus 100A according to the first embodiment, which is a signal processing apparatus that analyzes a musical score of a desired music piece (hereinafter referred to as "target music piece"), is implemented by a computer system including an arithmetic processing device (processor unit) 10, a storage device 12, a display device 14 and a sounding device 16. For example, a mobile information terminal, such as a portable phone or a smart phone, or a mobile or stationary information processing device, such as a personal computer, may be used as the musical score analysis apparatus 100A.

The arithmetic processing device 10 collectively controls individual elements of the musical score analysis apparatus 100A by performing various control operations and arithmetic operations. The display device (e.g., liquid crystal display panel) 14 displays an image corresponding to an instruction given from the arithmetic processing device 10. The sounding device 16 radiates a sound corresponding to an instruction given from the arithmetic processing device 10. For example, a musical score of a given music piece (target music piece) is displayed on the display device 14, and reproduced sounds (singing voices and performance sounds) of the given music piece (target music piece) are radiated from the sounding device 16.

The storage device 12 stores various programs for execution by the arithmetic processing device 10 and various data for use by the arithmetic processing device 10. For example, any desired conventionally-known storage medium, such as a semiconductor recording medium or a magnetic recording medium, or a combination of a plurality of conventionally-known types of recording media may be employed as the storage device 12. The storage device 12 in the first embodiment stores (sets of) musical score image data $D_A$ and logical musical score data $D_B$ for the target music piece.

The musical score image data $D_A$ is data representative of an image of the musical score of the target music piece. More specifically, an image file (e.g., PDF file) representing the musical score image as a plane image of a raster format, vector format or the like is suited for use as the musical score image data $D_A$. The logical musical score data $D_B$, on the other hand, is data describing content of the target music piece in a particular data description language. More specifically, a musical-score expressing file (e.g., file of a Music XML format) where elements, such as musical symbols, of the musical score is suited for use as the logical musical score data $D_B$.

Figure 1B:
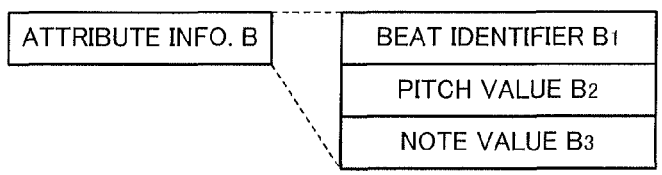
FIG. 1B is a block diagram showing an example organization of logical musical score data.

As shown in FIG. 1B, the logical musical score data $D_B$ includes attribute information B for each of notes constituting the target music piece. The attribute information B is information defining musical attributes of the note, and it includes a beat identifier B1, a pitch B2 and a note value B3. The beat identifier B1 is information designating a temporal position, in the target music piece, of the note (i.e., information identifying the note). More specifically, the number of beats present from the beginning of the target music piece to the note (e.g., beat number of the note counted using a sixty-fourth note as one beat) is suited for use as the beat identifier B1. The pitch B2 is a pitch name (note No.) of the note, and the note value B3 indicates duration, on the musical score, of the note. Note that the attribute information B is of any desired content; for example, performance information, such as dynamics (forte, piano, etc.), staccato or slur, may be designated by the attribute information B.

Note that, in the following description, the musical score represented by the logical musical score data $D_B$ will sometimes be referred to as "logical musical score" in order to distinguish from the musical score represented as an image by the musical score image data $D_A$ (musical score image). The musical scores of the target music piece represented by the musical score image data $D_A$ and the logical musical score data $D_B$ (i.e., musical score image and logical musical score) each also contains, in addition to a time series of the plurality of notes constituting the target music piece, a staff notation (or a great staff comprising a plurality of parallel rows of staff notations), a clef (e.g., treble clef or bass clef), accidental mark (e.g., key signature, accidental marks), musical signs (e.g., dynamics marks, tempo marks and repeat mark), etc.

The musical score image data $D_A$ and the logical musical score data $D_B$ are delivered, for example, from a delivery apparatus (typically a server) to the musical score analysis apparatus 100A via a communication network, such as the Internet and stored into the storage device 12 of the musical score analysis apparatus 100A. For example, a musical score delivery service is conceivable by which a user having purchased musical score image data $D_A$ of a desired target music piece is additionally supplied with logical musical score data $D_B$ of the target music piece for a fee or free of charge. Note that musical score image data $D_A$ and logical musical score data $D_B$ stored, for example, in a mobile recording medium attachable to the musical score analysis apparatus 100A may also be transferred to the storage device 12. In conventionally-known sale of an electronic musical score, it is common to deliver only musical score image data $D_A$.

Figure 2:
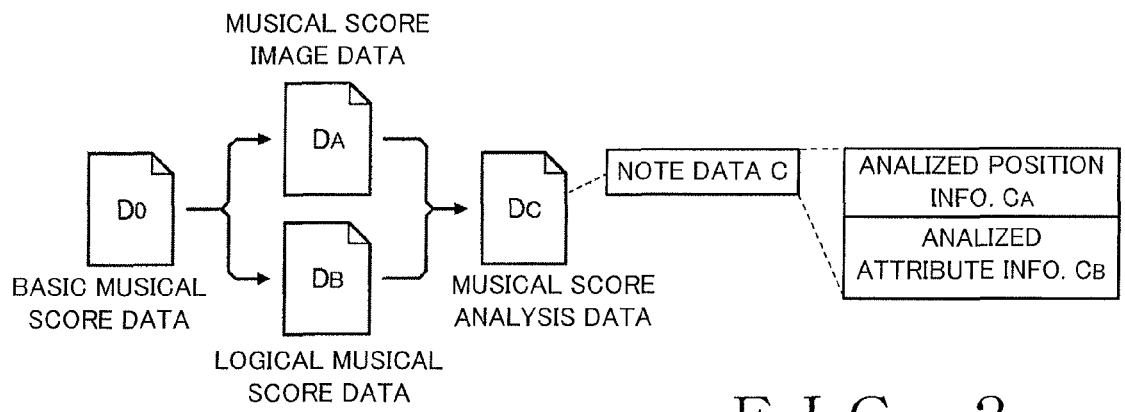
FIG. 2 is a block diagram explanatory of musical score image data and the logical musical score data.

As shown in FIG. 2, the musical score image data $D_A$ and the logical musical score data $D_B$ in the first embodiment are generated from common basic musical score data Do representative of the musical score of the target music piece. The basic musical score data Do is created in advance using musical-score creating (musical-score engraving) software. The musical score image data $D_A$ is generated by adjusting a form (e.g., layout) of the musical score, represented by the basic musical score data Do, for a displaying or printing purpose, and the logical musical score data $D_B$ is generated by adjusting the basic musical score data Do of a format specific to musical-score creating software into a general-purpose format. Note that the basic musical score data Do can be used also as the logical musical score data $D_B$ (the musical score image data $D_A$ can be generated by adjusting a form of the musical score represented by the logical musical score data $D_B$.

Because the musical score image data $D_A$ and the logical musical score data $D_B$ depend on the common basic musical score data Do, the content of the musical score basically coincide between the musical score image data $D_A$ and the logical musical score data $D_B$. However, because the musical score image data $D_A$ represents the musical score as an image whereas the logical musical score data $D_B$ represents the musical score as logical information, note-by-note correspondence relationship between the musical score image represented by the musical score image data $D_A$ and the logical musical score represented by the logical musical score data $D_B$ is unknown. Note that it is not necessarily essential that the musical score image data $D_A$ and the logical musical score data $D_B$ be generated from the common basic musical score data Do. For example, musical score image data $D_A$ and logical musical score data $D_B$ created separately (e.g., created by different creators) for a common or same target music piece may be made objects of processing.

The arithmetic processing device (processor unit) 10 of FIG. 1A is implemented by cooperation between a general-purpose arithmetic processing device, such as a CPU (Central Processing Unit), and a program. Namely, the arithmetic processing device (processor unit) 10 in the form of a CPU performs a plurality of functions for analyzing and using the musical score of the target music piece (i.e., musical score analysis section 22 and musical score using section 24) by executing a program stored in the storage device 12. Note that the arithmetic processing device (processor unit) 10 may be in the form of a dedicated processor, such as a DSP, capable of executing microprograms, rather than a general-purpose CPU. Alternatively, the arithmetic processing device (processor unit) 10 may be a processor constructed of dedicated hardware circuitry (integrated circuit or a group of discrete circuits) so as to implement desired processing functions.

In the case where the musical score analysis apparatus 100A is implemented by a computer system, a program capable of executing the method of the present invention by means of a computer (processor unit) can be installed into the computer by being stored into a computer-readable recording medium and then provided to the computer in the recording medium. Such a recording medium is, for example, a non-transitory recording or storage medium that is preferably an optical recording medium (optical disk), such as a CD-ROM; alternatively, however, the recording medium may be a recording medium of any desired conventionally-known format, such as a semiconductor recording medium or a magnetic recording medium. Further, as another example, the aforementioned program may be delivered to the computer via a communication network and installed into a non-transitory recording medium within the computer.

The musical score analysis section 22 analyzes correspondence relationship between a time series of a plurality of notes identified from the musical score image represented by the musical score image data $D_A$ (hereinafter referred to as "image note sequence") and a time series of a plurality of notes identified from the logical musical score represented by the logical musical score data $D_B$ (hereinafter referred to as "logical note sequence"). More specifically, the musical score analysis section 22 generates musical score analysis data $D_C$ defining correspondence relationship between the individual notes of the image note sequence and the individual notes of the logical note sequence.

As illustratively shown in FIG. 2, the musical score analysis data $D_C$ is a time series of note data C corresponding to a plurality of notes constituting the target music piece. Note data C corresponding to any one of the notes includes analyzed position information $C_A$ and analyzed attribute information $C_B$. The analyzed position information $C_A$ is information identifying a position, in the musical score image represented by the musical score image data $D_A$, of the note. For example, the analyzed position information $C_A$ is represented as coordinates (X and Y coordinates) on a coordinate plane defined for the musical score image. The analyzed attribute information $C_B$ is information defining musical attributes of the note in the target music piece; more specifically, the attributes are determined on the basis of the attribute information B (beat identifier B1, pitch B2 and note value B3) of the note included in the analyzed attribute information $C_B$. As seen from the foregoing description, correspondence relationship between the individual notes of the musical score image represented by the musical score image data $D_A$ and the individual notes of the logical musical score represented by the logical musical score data $D_B$ can be defined by associating the analyzed position information $C_A$ indicative of a position of each one of the notes in the musical score image and the analyzed attribute information $C_B$ defining attributes of any one of the notes in the logical musical score with each other as one note data C of the musical score analysis data $D_C$. In a case where the musical score image comprises a plurality of pages, it is also possible to include information of page Nos. etc. in the analyzed position information $C_A$.

Figure 3:
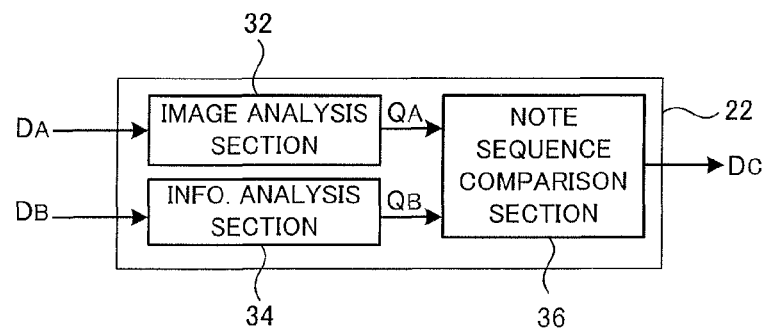
FIG. 3 is a block diagram showing a detailed construction of a musical score analysis section of the musical score analysis apparatus.
Figure 4:
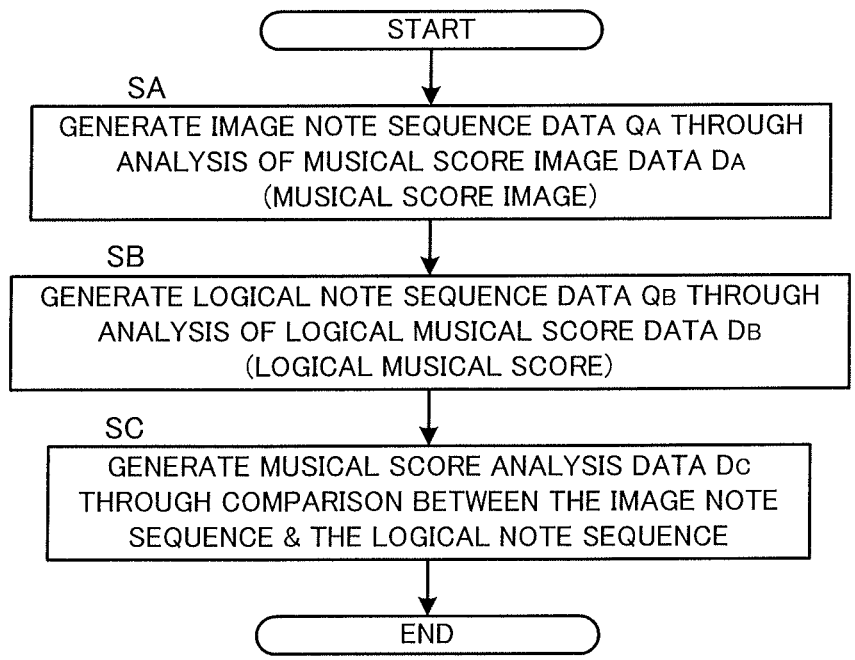
FIG. 4 is a flow chart of processing performed by the musical score analysis section.

FIG. 3 is a block diagram showing an example construction of the musical score analysis section 22, and FIG. 4 is a flow chart showing processing performed by the musical score analysis section 22. As illustratively shown in FIG. 3, the musical score analysis section 22 in the first embodiment includes an image analysis section 32, an information analysis section 34 and a note sequence comparison section 36. The image analysis section 32 generates image note sequence data $Q_A$ by retrieving from the storage device 12 musical score image data $D_A$ of a music piece to be analyzed and analyzing the retrieved musical score image data $D_A$, at step $S_A$. The image note sequence data $Q_A$ represents an image note sequence identified from the musical score image represented by the musical score image data $D_A$. Namely, the image analysis section 32 identifies an image note sequence from the musical score image.

Further, the information analysis section 34 of FIG. 3 generates logical note sequence data $Q_B$ from the logical musical score data $D_B$ stored in the storage device 12, at step $S_B$. The logical musical score data $D_B$ represents a logical note sequence identified from the logical musical score represented by the logical musical score data $D_B$. The note sequence comparison section 36 compares (or collates between) an image note sequence represented by the image note sequence data $Q_A$ generated by the image analysis section 32 and a logical note sequence represented by the logical note sequence data $Q_B$ generated by the information analysis section 34 and thereby identifies correspondence relationship between individual notes of the image note sequence and individual notes of the logical note sequence to thereby generate the above-mentioned musical score analysis data $D_C$, at step $S_C$. Specific processes performed by individual elements of the musical score analysis section 22 will be described later.

Figure 5:
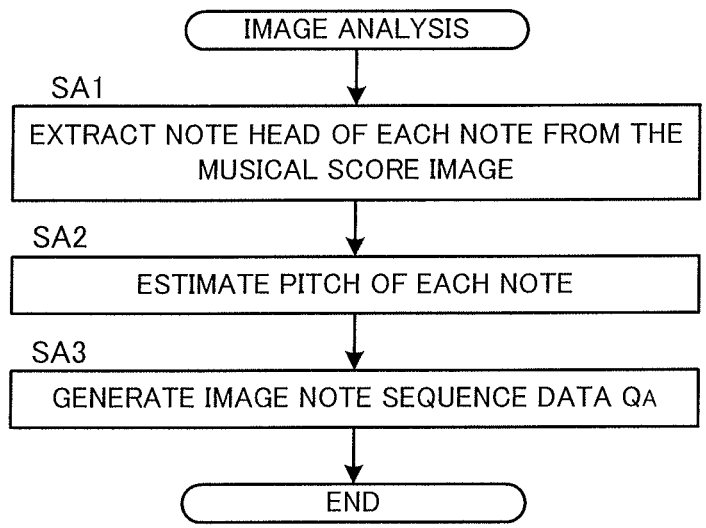
FIG. 5 is a flow chart of a process performed by an image analysis section of the musical score analysis apparatus.
Figure 6:
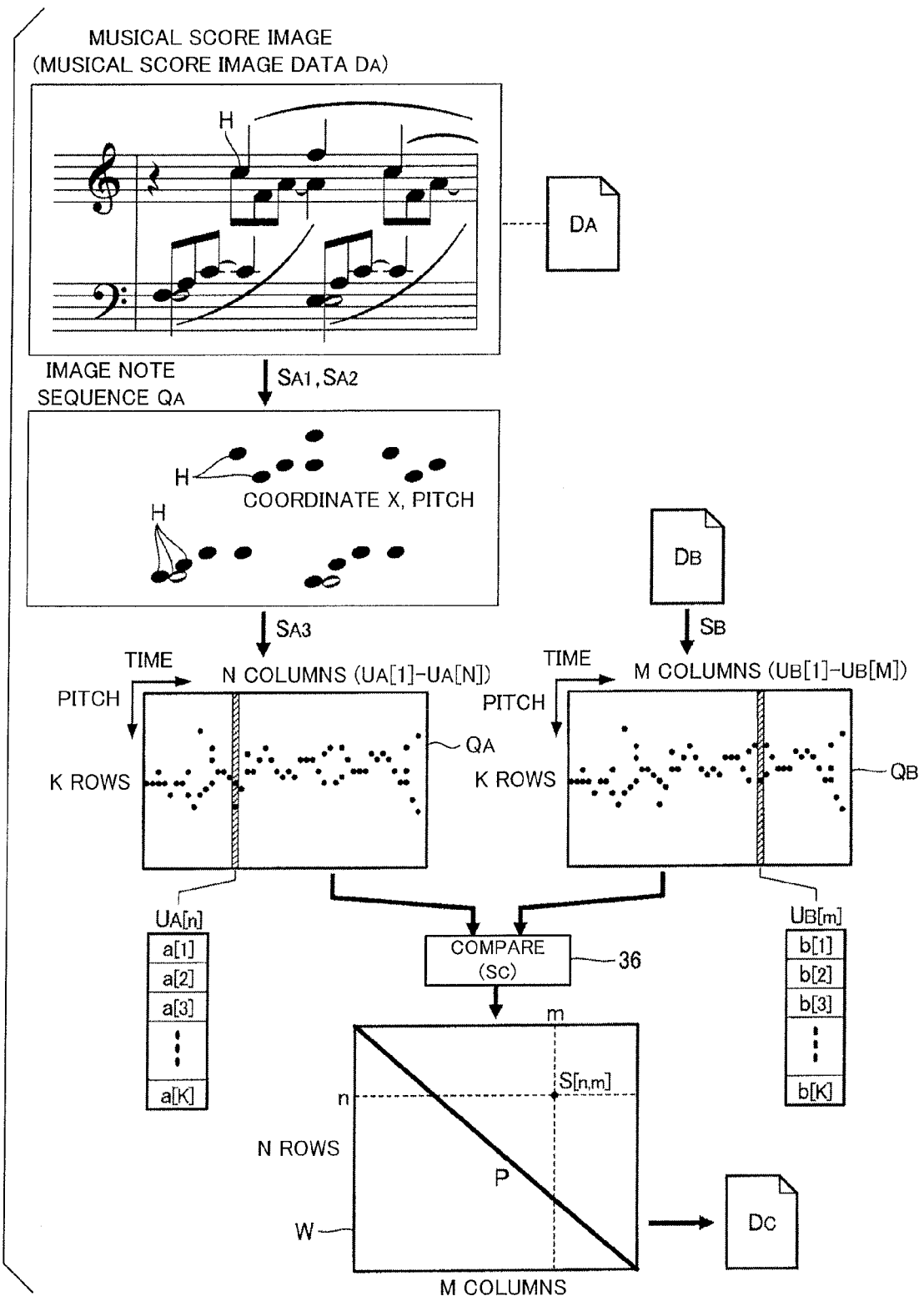
FIG. 6 is a view schematically explanatory of a specific example of operation of the musical score analysis section.

FIG. 5 is a flow chart of a process performed by the image analysis section 34 for generating the image note sequence data $Q_A$ (step $S_A$ above). FIG. 6 is a view schematically explanatory of a specific example of operation of the musical score analysis section 22. As shown in FIG. 6, the image analysis section 32 extracts, from the musical score image represented by the musical score image data $D_A$, a head (a generally circular mark indicative of a portion of the note other than a stem and a flag) of each note and identifies an coordinate X, in the musical score image, of the note head H, at step $S_{A1}$. Such extraction of each note head H may be executed using a conventionally-known image recognition (pattern recognition) technique as appropriate. Note that the musical score image to be subjected to the image recognition may be of any desired image format; for example, the musical score image may be of the raster format or the vector format where the note head H1 is represented as a single font or elliptical vector data. Because the note head H is a conventional simple mark, it can be extracted from the musical score image with a high accuracy. Note, however, that the stem (straight line) and flag (flag-shaped mark) of each note need not necessarily be extracted from the musical score image in the first embodiment. On the basis of the coordinate X identified for each of the note heads H, a time position, in the musical score image, of the note corresponding to the head H is identified.

Further, the image analysis section 32 estimates a pitch of each note (i.e., for each extracted note head H) of the target music piece by analyzing the musical score image represented by the musical score image data $D_A$. The image analysis section 32 in the first embodiment estimates a pitch of each note using musical symbols extracted from the musical score image. More specifically, the image analyzation 32 extracts, from the musical score image, a staff notation (or a great staff comprising a plurality of parallel rows of staff notations), a clef (e.g., treble clef or bass clef), accidentals and a key signature, and it estimates a pitch of each note in the musical score image in accordance with relative positional relationship between the note heads H and the staff notation and a type of the clef or accidental. For the extraction of such musical symbols, any desired conventionally-known may be used. Because the staff notation, clef and accidental are known simple marks, they can be extracted from the musical score image with a high accuracy. Therefore, a pitch of any note head H can be estimated or determined appropriately on the basis of a position, on the staff, of the note head H and with an accidental, key signature etc. into account. As may be understood from the foregoing, the image analysis section 32 identifies the note head H (coordinate X) and pitch of each note in the image note sequence.

The image analysis section 32 generates image note sequence data $Q_A$ at step $S_{A3}$ corresponding to results of the aforementioned analysis (steps $S_{A1}$ and $S_{A2}$). As illustratively shown in FIG. 6, the image note sequence data $Q_A$ contains a time series of N (N is a natural number equal to or greater than two) unit data $U_{A[1]}$-$U_{A[N]}$. The N unit data $U_{A[1]}$-$U_{A[N]}$ correspond to a plurality of unit segments obtained by segmenting the target music piece per predetermined note value (note value corresponding, for example to, a sixty-fourth note); more specifically, the N unit data $U_{A[1]}$-$U_{A[N]}$ correspond, on a one-to-one basis, to N unit segments including start points of one or more notes (single note or chord component notes) in the image note sequence (namely, N unit segments of the plurality of unit segments in the image note sequence other than those unit segments having no start point of a note). Therefore, the number N of the unit data $U_{A[n]}$ (n=1–N) included in the image note sequence data $Q_A$ is a variable value corresponding to the length of the target music piece and the number of notes in the image note sequence.

As illustratively shown in FIG. 6, each of the N unit data $U_{A[1]}$-$U_{A[N]}$ in the image note sequence data $Q_A$ is a K-order vector containing K (K is a natural number equal to or greater than two) corresponding to the number of all pitches (pitch names) within a range expressable by the musical score in question. Namely, the image note sequence data $Q_A$ is expressed in a determinant of K rows and N columns, where K rows correspond to pitches and N columns correspond to time. The image analysis section 32 sets each vector element $a_{[k]}$ (k=1–K) of unit data $U_{A[n]}$ corresponding to an n-th unit segment at a numerical value (1 or 0) of a bit corresponding to presence/absence of a note of a k-th pitch in the n-th unit segment in the image note sequence. More specifically, of the K vector elements a[1]-a[K] contained in the unit data $V_A$[n], one or more vector elements a[k] corresponding to pitches of one or more notes (single note or chord component notes) present in the n-th unit segment in the image note sequence are set at the value "1", and the remaining vector element a[k] are set at the value "0". In this case, each unit data $U_A$[n] is represented by bit vector data of a plurality of (i.e., K) bits.

For example, if one note of a k1-th ("k1" is one of 1 to K) pitch is present independently in the n-th unit segment in the image note sequence, the k1-th vector element a[k1] of the K vector elements a[1]-a[K] of the unit data $U_A$[n] is set the value "1", while the remaining (K−1) vector elements a[k] are each set at the value "0". Note that a plurality of notes of different pitches (i.e., chord component notes) can be present in each unit segment. If two notes (chord component notes) corresponding to k1-th and k2-th (k1≠k2) vector elements are present in the same n-th unit segment, the k1-th vector element a[k1] and k2-th vector element a[k2] of the K vector elements a[1]-a[K] of the unit data $U_A$[n] are set at the value "1", while the remaining (K−2) vector elements a[k] are each set at the value "0". Namely, any unit data $U_A$[n] in the image note sequence data $Q_A$ can represent not only a single note but also chord component notes.

As seen from the foregoing description, any unit data $U_A$[n] in the image note sequence data $Q_A$ represents a pitch of a note (short note or chord) of the image note sequence in an n-th unit segment, and a time series of N unit data $U_A$[1]-$U_A$[N] (i.e., image note sequence data $Q_A$) represents a temporal transition, over N unit segments, of pitches of individual notes in the image note sequence. Namely, the image note sequence data $Q_A$ comprises a time series of vector data that indicates, for each pitch, presence/absence of a note in a same time segment (unit segment) in a musical score image. Thus, a plurality of notes (typically, chord component notes) to be sounded in parallel in a same time segment (unit segment) can be expressed appropriately by unit data (vector data format).

Further, the information analysis section 34 of FIG. 3 generates logical note sequence data $Q_B$ representative of the logical note sequence of the logical musical score represented by the logical musical score data $D_B$, at step $S_B$. As illustratively shown in FIG. 6, the logical note sequence data $Q_B$ comprises a time series of M (M is a natural number equal to or greater than two) unit data $U_B$[1]-$U_B$[M]. The M unit data $U_B$[1]-$U_B$[M] correspond, in one-to-one relation, to M unit segments including start points of one or more notes (single note or chord component). Thus, the number M of unit data $U_B$[m] (m=1 to M) is a variable value corresponding to the length of the target music piece and the number of notes in the logical note sequence. The number of notes in the image note sequence and the number of notes in the logical note sequence do not accurately match each other due to, among other things, an error in recognition, by the image analysis section 32, of the note heads H. Thus, the number N of unit data $U_A$[n] in the image note sequence and the number M of unit data $U_B$[m] in the logical note sequence do not necessarily match each other.

Like the aforementioned unit data $U_A$[n], each of the M unit data $U_B$[1]-$U_B$[M] includes K vector elements b[1]-b[K] corresponding to the number of all pitches (pitch names) within a predetermined range. The information analysis section 34 sets each vector element b[k] of the unit data $U_B$[m] corresponding to the m-th unit segment in the logical note sequence at a value corresponding to presence/absence of a note of a k-th pitch in the m-th unit segment in the logical note sequence. More specifically, of the K vector elements b[1]-b[K] included in the unit data $U_B$[m], one or more vector elements b[k] corresponding to pitches of one or more notes present in the m-th unit segment are set at the value "1", while the remaining vector elements b[k] are set at the value "0". In this case, each unit data $U_B$[m] is represented by bit vector data of a plurality of, i.e. K, bits.

For example, if a note of the k1-th pitch is present independently in the m-th unit segment of the logical note sequence, the k1-th element b[k1] of the unit data $U_B$[m] is set at the value "1", while the remaining (K−1) elements b[k] are set at the value "0". Further, if two notes of the k1-th and k2-th pitches are present in the m-th unit segment of the logical note sequence, the k1-th element b[k1] and k2-th element b[k2] of the unit data $U_B$[m] are set at the value "1", while the remaining (K−2) elements b[k] are set at the value "0". Namely, any unit data $U_B$[m] in the logical note sequence $Q_B$ can represent not only a single note but also a chord in the logical note sequence.

As seen from the foregoing description, any unit data $U_B$[m] in the logical note sequence data $Q_B$ represents a pitch of a note (short note or chord) in the m-th unit segment, and a time series of M unit data $U_B[1]$-$U_B[M]$ represents a temporal transition of pitches of individual notes in the logical note sequence. Namely, the logical note sequence data Qs comprises a time series of vector data that indicates, for each pitch, presence/absence of a note in a same time segment (unit segment) that can be grasped from the logical note sequence data $Q_B$. Thus, a plurality of notes (typically chord component notes) to be sounded in parallel in the same time segment (unit time) can be expressed appropriately by the unit data (vector data format).

The note sequence comparison section 36 of FIG. 3 generates musical score analysis data $D_C$ by comparing the image note sequence represented by the image note sequence $Q_A$ and the logical note sequence represented by the logical note sequence $Q_B$. Although any conventionally-known technique may be employed for the comparison between the image note sequence and the logical note sequence, the DP (Dynamic Programming) matching to be illustratively described hereinbelow is preferable.

Further, the note sequence comparison section 36 calculates a degree of similarity S[n,m] for each combination of any one of the N unit data $U_A[1]$-$U_A[N]$ (i.e., $U_A[n]$) of the image note sequence data $Q_A$ and any one of the unit data $U_B[1]$-$U_B[M]$ (i.e., $U_B[m]$) of the logical note sequence data $Q_B$. Thus, an analysis matrix (cost matrix) of N rows×M columns comprising degrees of similarity S[1,1]-S[N,M] is generated as illustratively shown in FIG. 6. The degree of similarity S[n,m] is an index for evaluating a level of similarity (correlation or distance) between the unit data $U_A[n]$ and the unit data $U_B[m]$. The note sequence comparison section 36 in the first embodiment calculates, as the degree of similarity S[n,m], a cosine distance between the unit data $U_A[n]$ and the unit data $U_B[m]$. Thus, the degree of similarity S[n,m] increases as the unit data $U_A[n]$ and the unit data $U_B[m]$ get more similar to each other.

Further, the note sequence comparison section 36 searches, from among a plurality of paths from a point (node point) corresponding to a combination between the unit data $U_A[1]$ and the unit data $U_B[1]$ in the analysis matrix W to a point corresponding to a combination between the unit data $U_A[N]$ and the unit data $U_B[M]$ in the analysis matrix W, for an optimal path (matching path) where a cumulative (accumulated) value of degrees of similarity S[n,m] at individual points on the path is the greatest among the above-mentioned plurality of paths. Such a cumulative value of degrees of similarity S[n,m] may be calculated taking into account costs of movement between the individual points. The note sequence comparison section 36 generates musical score analysis data $D_C$ by time-serially arranging, over the entire optimal path P, note data C corresponding to the combinations between the unit data $U_A[n]$ and the unit data $U_B[m]$ at the individual points on the optimal path P.

More specifically, analyzed position information $C_A$ of the note data C corresponding to the combination between the unit data $U_A[n]$ and the unit data $U_B[m]$ at each of the points on the optimal path P is set to an coordinate X (i.e., time position in the musical score image of the musical score image data $D_A$) of a note head H identified from the musical score image by the image analysis section 32 for a note in the n-th unit segment of the image note sequence (steps $S_{A1}$ and $S_{A2}$). The analyzed position information $C_A$ of the note data C may include a coordinate Y (i.e., coordinate position in the pitch direction) in addition to the coordinate X of the note head H as noted above. Further, analyzed attribute information $C_B$ of the note data C corresponding to the combination between the unit data $U_A[n]$ and the unit data $U_B[m]$ is set to attribute information B (beat identifier B1, pitch B2 and note value B3) designated by the logical musical score data $D_B$ for a note in the m-th unit segment of the logical note sequence. Thus, correspondence relationship between individual notes in the musical score image represented by the musical score image data $D_A$ and individual notes in the logical musical score represented by the logical musical score data $D_B$ is defined by the musical score analysis data $D_C$. The foregoing have described a specific construction and behavior of the musical score analysis section 22.

Further, the musical score using section 24 of FIG. 1A uses a result of analysis by the musical score analysis section 22 (i.e., musical score analysis data $D_C$). The musical score using section 24 in the first embodiment performs in parallel musical score display using the musical score image data $D_A$ and music piece reproduction (i.e., automatic performance) using the logical musical score data $D_B$. More specifically, the musical score using section 24 displays on the display device 14 the musical score represented by the musical score image data $D_A$ but also radiates, via the sounding device 16, reproduced sounds of the target music piece designated by the musical score represented by the logical musical score data $D_B$.

Further, the musical score using section 24 in the first embodiment sequentially identifies, with reference to the musical score analysis data $D_C$, a portion (measure or note) of the musical score image, represented by the musical score image data $D_A$, which corresponds to a current reproduced portion of the logical musical score and highlights (i.e., displays in a highlighted style) the identified portion of the musical score image. For example, the musical score using section 24 displays a note corresponding to a current reproduced portion of the logical musical score, from among a plurality of notes in the musical score image displayed on the display device 14, in a highlighted style (e.g., in a different color or blinking style) distinguishable from the display of the remaining notes. Such a note to be displayed in the highlighted style changes from one to another over time in accordance with a progression of reproduction of the target music piece. Namely, the musical score display (reproduced position display) using the musical score image data $D_A$ and the music piece reproduction using the logical musical score data $D_B$ are synchronized with each other. Thus, a user can listen to reproduced sounds of the target music piece while visually checking content of the musical score and current reproduced position of the target music piece by viewing the musical score image displayed on the display device 14.

With the first embodiment of the present invention described above, it is possible to identify correspondence relationship between individual notes in the image note sequence identified from the musical score image represented by the musical score image data $D_A$ and individual notes in the logical note sequence represented by the logical musical score data $D_B$, by comparison between the image note sequence and the logical note sequence. Thus, the first embodiment of the present invention can realize diversified use of the musical score based on a combination of the musical score image data $D_A$ and the logical musical score data $D_B$.

With the aforementioned musical score image data $D_A$, it is possible to display the musical score in a desired form (i.e., in a layout intended by a human creator), but it is difficult to accurately recognize elements, such as notes and musical symbols, in the displayed musical score. With the logical musical score data $D_B$, on the other hand, it is possible to grasp elements, such as notes and musical symbols, in the musical score accurately and in detail, but it is difficult to display the musical score in a desired form; the form of display of the musical score depends on an algorithm of a rendering engine. In the above-described first embodiment, where correspondence relationship between individual notes in the image note sequence identified from the musical score image data $D_A$ and individual notes in the logical note sequence identified from the logical musical score data $D_B$ is analyzed, it is possible to reproduce the target music piece on the basis of accurate and detailed information represented by the logical musical score data $D_B$ while displaying the musical score in a desired form by use of the musical score image data $D_A$. With the first embodiment of the present invention, as understood from the foregoing, it is possible to efficiently use merits or advantages of both the musical score image data $D_A$ and the logical musical score data $D_B$; that is, the above-described first embodiment allows the musical score image data $D_A$ and the logical musical score data $D_B$ to make up for each other's demerits or disadvantages.

Further, with the above-described first embodiment, where the image note sequence is identified on the basis of extraction of note heads H of the individual notes in the musical score image and estimation of pitches of the individual notes, it is possible to identify correspondence relationship between the individual notes in the musical score image sequence and the individual notes in the logical note sequence with a high accuracy as compared to a construction where pitches of the individual notes are not estimated (i.e., construction where an arrangement of the individual notes whose note heads H have been extracted is identified as the image note sequence). Particularly, with the first embodiment, where pitches of the individual notes are estimated using musical symbols, such as a staff notation, a clef and accidentals extracted from the musical score image, it is possible to estimate pitches of the individual notes in the image note sequence with a high accuracy as compared to a construction where pitches of the individual notes are estimated only based on positions of the note heads H.

Furthermore, in the above-described first embodiment, each unit data $U_A[n]$ in the image note sequence data $Q_A$ comprises K elements $a[1]$-$a[K]$ corresponding to present/absence of notes of individual pitches in the image note sequence, and thus, not only a single note in the unit segment but also a plurality of notes (typically, chord component notes) to be sounded in parallel with one another are represented by the unit data $U_A[n]$. Thus, the instant embodiment can properly present an image note sequence even for a target music piece including chords. Similarly, because each unit data $U_B[m]$ in the logical note sequence data $Q_B$ comprises K elements $b[1]$-$b[K]$ corresponding to present/absence of notes of individual pitches in the logical note sequence, the instant embodiment can properly present a logical note sequence even for a target music piece including chords.

Where a chord comprising a plurality of notes (chord component notes) of pitches close to each other is expressed on a musical score, the chord component notes (see v1 and v2 in FIG. 7) may sometimes differ in position on the time axis, as illustrated in FIG. 7. The chord component notes v1 and v2 are notes to be sounded concurrently as a matter of fact, but if the musical score image of FIG. 7 is analyzed by the image analysis section 32, it is sometimes likely that the notes v1 and v2 are recognized as notes of different time segments and expressed as different unit data $U_A[n]$. However, in the above-described first embodiment, where the DP matching (dynamic time stretch/contraction) is employed for making comparison between the image note sequence and the logical note sequence, the chord component notes v1 and v2 are considered as corresponding to a common note in the logical musical score, so that a difference in time-axial position between the chord component notes v1 and v2 would not become a particular problem. As understood from the foregoing, the above-described embodiment can eliminate a need to precisely recognize, in the course of musical score image analysis, whether a plurality of notes of a target music piece are concurrent notes in a musical score (i.e., whether or not the notes are component notes of a chord or separate notes).

Second Embodiment

Next, a second embodiment of the present invention will be described. In the following description of the second embodiment, elements similar in operation and function to those in the first embodiment will be represented by the same reference characters as used in the description of the first embodiment, and description of these elements will be omitted as appropriate in order to avoid unnecessary duplication.

FIG. 8 is a block diagram showing an example overall setup of a musical score analysis apparatus 100B constructed to embody a method and apparatus according to a second embodiment of the present invention. The musical score analysis apparatus 100B according to the second embodiment is implemented by a server apparatus (typically, a web server) capable of communicating with a terminal device 92 via a communication network (e.g., the Internet) 90. The terminal device 92 is, for example, a mobile terminal, such as a portable phone or a smart phone, or a mobile or stationary communication terminal, such as a personal computer.

The musical score analysis apparatus 100B is implemented by a computer system including an arithmetic processing device 60 and a storage device 62. The storage device 62 stores various programs for execution by the arithmetic processing device 60 and various data for use by the arithmetic processing device 60. For example, any desired conventionally-known storage medium, such as a semiconductor recording medium or a magnetic recording medium, or a combination of a plurality of conventionally-known types of recording media may be employed as the storage device 62. The storage device 62 in the second embodiment stores a plurality of (sets of) logical musical score data $D_B$ for a plurality of music pieces. The terminal device 92, on the other hand, stores a plurality of (sets of) musical score image data $D_A$ representative of musical scores of different music pieces. As illustratively shown in FIG. 8, the musical score image data $D_A$ of a target music piece selected by a user from among the plurality of musical score image data $D_A$ is transmitted from the terminal device 92 to the musical score analysis apparatus 100B via the communication network 90. Note that, in the construction where the musical score analysis apparatus 100B retains a plurality of musical score image data $D_A$, identification information for identifying a user-selected target music piece can be transmitted from the terminal device 92 to the musical score analysis apparatus 100B (the musical score image data $D_A$ is not itself transmitted to the musical score analysis apparatus 100B). The musical score analysis apparatus 100B selects, as a target of processing, the musical score image data $D_A$ identified by the identification information received from the terminal device 92.

The arithmetic processing device 60 of the musical score analysis apparatus 100B functions as a musical score analysis section 22 similar to the musical score analysis section 22 in relation to the first embodiment, by executing a program stored in the storage device 62. The musical score analysis section 22 of the musical score analysis apparatus 100B selects, from among the plurality of logical musical score data $D_B$ stored in the storage device 62, the logical musical score data $D_B$ corresponding to a target music piece represented by the musical score image data $D_A$ received from the terminal device 92. Then, the musical score analysis section 22 compares the image note sequence of the musical score image represented by the musical score image data $D_A$ (image note sequence data $Q_A$) received from the terminal device 92 and the logical note sequence represented by the logical musical score data $D_B$ (logical note sequence data $Q_B$) and thereby generates musical score analysis data $D_C$ indicative of correspondence relationship between individual notes in the image note sequence and individual notes in the logical note sequence. The musical score analysis section 22 in the second embodiment is similar in specific construction and operation to the musical score analysis section 22 in the first embodiment. Whereas the musical score analysis section 22 of the musical score analysis apparatus 100B has been described above as selecting the logical musical score data $D_B$ corresponding to the target music piece represented by the musical score image data $D_A$ received from the terminal device 92, it may be configured to estimate correlation between the musical score image data $D_A$ and each of the logical musical score data $D_B$ and select one of the logical musical score data $D_B$ that presents the greatest correlation with the musical score image data $D_A$.

The musical score analysis apparatus 100B transmits to the terminal device 92 the musical score analysis data $D_C$ generated by the musical score analysis section 22 and the logical musical score data $D_B$ of the target music piece. Thus, the musical score image data $D_A$ and logical musical score data $D_B$ of the target music piece and the musical score analysis data $D_C$ indicative of correspondence relationship between the musical score image and the logical musical score of the target music piece are retained in the terminal device 92. The terminal device 92 functions as a musical score using section 24 similar to the musical score using section 24 in the first embodiment. Namely, by reference to the musical score analysis data $D_C$, the terminal device 92 performs musical score display (display of a reproduced position) using the musical score image data $D_A$ and music piece reproduction using the logical musical score data $D_B$ in parallel and in synchronism with each other. The second embodiment can achieve the same advantageous benefits as the first embodiment.

The musical score analysis apparatus 100B has been described above as including the musical score analysis section 22 similar to the musical score analysis section 22 in the first embodiment. Alternatively, there may be employed a construction where the terminal device 92 performs the process ($S_A$) for identifying the image note sequence (image note sequence data $Q_A$) through analysis of the musical score image represented by the image note sequence data $Q_A$ and where the image note sequence data $Q_A$ is transmitted from the terminal device 92 to the musical score analysis apparatus 100B. The musical score analysis apparatus 100B generates musical score analysis data $D_C$ by comparing the image note sequence $Q_A$ received from the terminal device 92 and the logical note sequence $Q_B$ identified from the logical musical score data $D_B$ stored in the storage device 52. As understood from the foregoing description, the image analysis section 32 described above in relation to the first embodiment may be omitted from the musical score analysis apparatus 100B. Further, identification information for identifying the image note sequence data $Q_A$ may be transmitted from the terminal device 92 to the musical score analysis apparatus 100B, and it is also possible to select one of the plurality of logical musical score data $D_B$ that presents the greatest correlation with the musical score note sequence data $Q_A$.

<Modifications>

The above-described embodiments may be modified variously, and various specific modifications will be illustratively described hereinbelow. Any two or more modifications selected from the following may be combined as desired.

(1) Whereas each of the embodiments has been described above as comparing an image note sequence and a logical note sequence with reference to pitches of individual notes of a music piece, such reference to the pitches of the individual notes may be omitted. It is also possible to compare an image note sequence where individual note heads H extracted from a musical score image (musical score image data $D_A$) are arranged in a time series and a logical note sequence identified from a logical musical score and thereby associate individual notes (note heads H) of the image note sequence and the logical note sequence with each other in one-to-one relation.

(2) Further, whereas each of the embodiments has been described above as comparing an image note sequence and a logical note sequence with reference to pitches of individual notes, the image note sequence and the logical note sequence may be compared by use of any other information than the pitches identifiable from musical score image data $D_A$ and logical musical score data $D_B$. For example, a type of a note head H, i.e. whether the note head H is in the form of a white ellipse (indicating a whole note or half note) or a black ellipse (indicating a note of a note value of a dotted quarter note or below), may be identified from the musical score image, in which case it is possible to partly estimate a note value (i.e., whether the note is a half note or over, or a dotted quarter note or below) may be partly estimated on the basis of the identified note head type. Thus, at the time of the comparison between the image note sequence and the logical note sequence, results of the identification between the white and black ellipses (i.e., length of duration of note values of individual notes in the image note sequence) can be taken into account. More specifically, the note sequence comparison section 36 analyzes correspondence relationship between the individual notes in the image note sequence and the individual notes in the logical note sequence under the condition that notes in the image note sequence corresponding to the black-ellipse note heads H do not correspond to notes of note values in the logical note sequence that are greater than a predetermined value (i.e., notes that should essentially be represented by the white-ellipse note heads H). Also note that rests may be included in the concept of notes according to the present invention. Namely, according to the present invention, it is also possible to analyze correspondence relationship between rests (image note sequence) recognized from a musical score image of the musical score image data $D_A$ and rests (logical note sequence) recognized from a logical musical score image of the logical musical score image data $D_B$. Also, relationship between measure or bar lines (i.e., boundary lines between successive measures) extracted from a musical score image represented by the musical score image data $D_A$ and measure lines of a musical score represented by the logical musical score data $D_B$ may be referenced at the time of comparison between the image note sequence and the logical note sequence. For example, the note sequence analysis section associates the individual notes (including rests) of the image note sequence and the individual notes (including rests) of the logical note sequence within mutually corresponding measures.

(3) Further, each of the embodiments has been described above as focusing on analysis of correspondence relationship between individual notes in an image note sequence and individual notes in a logical note sequence. If such correspondence relationship between the individual notes in an image note sequence and the individual notes in a logical note sequence is identified, it is also possible to recognize (supplement), from the logical musical score data $D_B$, musical information accompanying the individual notes of the musical score image represented by the musical score image data $D_A$. For example, for the individual notes of the musical score image represented by the musical score image data $D_A$, various musical symbols, such as a staccato and a slur, a repeat mark indicative of a repetition of a particular section of a target music piece, bar lines indicative of boundaries between measures and (right/left) performance parts, can be supplemented with no need for recognition of the musical score image.

Furthermore, results of analysis of the correspondence relationship between the individual notes in the image note sequence and the individual notes in the logical note sequence may be used for recognition of the musical score image represented by the musical score image data $D_A$. Where a staccato is designated for a particular note in the logical musical score data $D_B$, it is possible to recognize with a high accuracy a staccato near the note of the musical score image represented by the musical score image data $D_A$, by reference to the logical musical score data $D_B$. Similarly, it is possible to recognize with a high accuracy musical symbols, such as a key signature and accidentals (flat, sharp, natural, etc.) contained in the musical score image, by reference to the logical musical score data $D_B$. Further, results of recognition of the musical score image executed with reference to the logical musical score data $D_B$ as noted above can be used for editing of the musical score image. For example, the present invention can, for example, realize editing to delete from, the musical score image (or from a target display) and in accordance with an instruction from a user, a musical symbol (such as a staccato) recognized from the musical score image with a high accuracy. Namely, the user can finely edit the musical score image data $D_A$ just as in editing of the logical musical score data $D_B$.

Because editing of the musical score image data $D_A$ can be done with reference to the logical musical score data $D_B$ as noted above, content of editing of the logical musical score data $D_B$, for example, responsive to a user's instruction can also be reflected in the musical score image of the musical score image data $D_A$. Further, a part or whole of the musical score image represented by the musical score image data $D_A$ can be replaced with an image of the musical score represented by the logical musical score data $D_B$. For example, the musical score image of the musical score image data $D_A$ is displayed on the display device 14 at an initial stage, and then, once a change in the musical key of the target music piece is instructed by a user, a logical musical score of a changed key (i.e., changed-to key) is generated from the logical musical score data $D_B$ and displayed on the display device 14. Then, information of the logical musical score designated by the logical musical score data $D_B$ can also be embedded in the musical score image data $D_A$.

(4) Furthermore, whereas each of the embodiments has been described above as estimating a pitch of each note in the image note sequence by use of a staff notation (great staff), a clef and accidentals extracted from the musical score image, the information to be used for the pitch estimation in the present invention is not limited to the aforementioned; for example, reference to the accidentals may be omitted. Namely, it is also possible to estimate a pitch of each note with reference to the staff notation and clef extracted from the musical score image (i.e., pitch of each note in which the clef should not be reflected). In the construction where a pitch is estimated per note in the image note sequence without the clef being reflected, a pitch is identified, without the clef being reflected, from the logical musical score image data $D_B$ per note for the logical note sequence as well, and then, the individual notes in the logical note sequence are compared with the individual notes of the image note sequence. Further, in a case where a type of the clef of the target music piece is known or identified in advance, it is also possible to estimate a pitch of each note on the basis of only a positional relationship between a note head H of the note and the staff notation (i.e., without the clef being taken into account). As understood from the foregoing, the image analysis section 32 in each of the embodiments can extract, from the musical score image, musical symbols including at least one of the staff notation, clef and accidental. Then, the image analysis section 32 represents the extracted musical symbols collectively as an element for estimating a pitch of each note.

(5) Furthermore, whereas each of the embodiments has been described above as using the musical score analysis data $D_C$ for synchronization between musical score display using the musical score image data $D_A$ and music piece reproduction using the logical musical score data $D_B$, use of the musical score analysis data $D_C$ is not limited to the aforementioned. For example, let's assume a scene where is used an electronic musical instrument that time-serially outputs performance data representative of content of a performance executed by a user. The musical score using section 24 compares or collates performance data output from the electronic musical instrument against the logical musical score data $D_B$ to thereby identify a current position of a performance by the user. Then, the musical score using section 24 sequentially identifies a portion (measure or note) of the musical score image, represented by the musical score image data $D_A$, that corresponds to a current performance position in the logical musical score, and it displays the identified portion in a highlighted style. Namely, the object of the highlighted display transitions over time in response to the performance, by the user, of the user. Thus, the user can practice playing the electronic musical instrument while checking his or her current performance position in the musical score image.

(6) Musical score image data $D_A$ can also be generated by an image reader device (e.g., scanner) reading a musical score printed, for example, on a sheet of paper. However, it is likely that the musical score cannot be read accurately due to a poor image reading accuracy. Thus, it is preferable to employ a construction where the musical score is read by the image reader device a plurality of times (typically three times or more) and results of analyses of individual sets of musical score image data $D_A$ and logical musical score data $D_B$ are comprehensively evaluated. For example, if results of analyses of correspondence relationship between individual image note sequences and logical note sequences differ among the plurality of sets of musical score image data $D_A$ due to read errors, correspondence relationship that appears in many of the results of analyses corresponding to the different musical score image data $D_A$ is employed as final results of analysis; namely, the final results of analysis are decided by majority decision. The aforementioned construction can achieve the advantageous benefit that correspondence relationship between the image note sequence and the logical note sequence can be analyzed with a high accuracy.

(7) Furthermore, whereas each of the embodiments has been described above in relation to the case where a file of the Music XML format is used as the logical musical score data $D_B$, the logical musical score data $D_B$ may be of any other suitable format. For example, correspondence relationship between the logical note sequence of the logical musical score data $D_B$ and the image note sequence of the musical score image data $D_A$ may be analyzed with time-series data (e.g., file of the MIDI format), designating a pitch and duration (sound generating length) per note, used as the logical musical score data $D_B$.

This application is based on, and claims priority to, JP PA 2013-263047 filed on 19 Dec. 2013. The disclosure of the priority application, in its entirety, including the drawings, claims, and the specification thereof, are incorporated herein by reference.

What is claimed is:

1. A computer-implemented method for analyzing a musical score based on musical score image data representing an image of a musical score of a given music piece and logical musical score data logically representing the musical score of the given music piece, the method comprising:
   identifying, based on the musical score image data of a first type file, an image note sequence that is a time series of a plurality of notes included in the image of the musical score of the given music piece;
   identifying, based on the logical musical score data of a second type file different from the first type file, a logical note sequence that is a time series of a plurality of notes included in the musical score of the given music piece; and
   generating musical score analysis data defining a correspondence relationship between individual ones of the notes in the image note sequence and individual ones of the notes in the logical note sequence by comparing the image note sequence and the logical note sequence,
   wherein said comparing the image note sequence and the logical note sequence compares a time series of vector data of the image note sequence and a time series of vector data of the logical note sequence.

2. The computer-implemented method as claimed in claim 1, wherein said identifying an image note sequence includes extracting a note head of each of the plurality of notes from the image of the musical score, and the image note sequence is identified based on individual ones of the extracted note heads.

3. The computer-implemented method as claimed in claim 2, wherein said identifying an image note sequence further includes estimating respective pitches of the notes based on the individual note heads extracted thereby.

4. The computer-implemented method as claimed in claim 3, wherein said identifying an image note sequence further includes extracting, from the image of the musical score, a musical symbol including at least one of a staff notation, a clef and an accidental, and said identifying an image note sequence estimates the respective pitches of the notes by use of the extracted musical symbol.

5. The computer-implemented method as claimed in claim 2, wherein said identifying an image note sequence further includes partly estimating note values of the individual notes based on types of the extracted note heads.

6. The computer-implemented method as claimed in claim 1, wherein the image note sequence comprises the time series of vector data each indicating, per pitch, present/absence of a note in a same time segment in the musical score image, and
   the logical note sequence comprises the time series of vector data each indicating, per pitch, present/absence of a note in a same time segment graspable from the logical musical score data.

7. The computer-implemented method as claimed in claim 1, which further comprises:
   displaying the image of the musical score of the given music piece based on the musical score image data; and
   controlling a display state of the displayed image of the musical score by use of the correspondence relationship.

8. The computer-implemented method as claimed in claim 7, which further comprises:
   reproducing the given music piece based on the logical musical score data; and
   controlling a display state of the displayed musical score in accordance with a current reproduced position of the given music piece.

9. The computer-implemented method as claimed in claim 7, which further comprises changing the musical score image data in accordance with the correspondence relationship and based on any of data included in the logical musical score data.

10. The computer-implemented method as claimed in claim 7, which further comprises:
    editing the logical musical score data; and
    changing the musical score image data in accordance with the correspondence relationship and the editing of the logical musical score data.

11. An apparatus for analyzing a musical score based on musical score image data representing an image of a musical score of a given music piece and logical musical score data logically representing the musical score of the given music piece, said apparatus comprising a processor unit configured to:
    identify, based on the musical score image data of a first type file, an image note sequence that is a time series of a plurality of notes included in the image of the musical score of the given music piece;
    identify, based on the logical musical score data of a second type file different from the first type file, a logical note sequence that is a time series of a plurality of notes included in the musical score of the given music piece; and
    generate musical score analysis data defining a correspondence relationship between individual ones of the notes in the image note sequence and individual ones of the notes in the logical note sequence by comparing the image note sequence and the logical note sequence,
    wherein said processor unit is configured to compare the image note sequence and the logical note sequence by comparing a time series of vector data of the image note sequence and a time series of vector data of the logical note sequence.

12. The apparatus as claimed in claim 11, wherein said processor unit is configured to extract a note head of each of the plurality of notes from the image of the musical score, and the image note sequence is identified based on individual ones of the extracted note heads.

13. The apparatus as claimed in claim 12, wherein said processor unit is further configured to estimate respective pitches of the notes based on the individual extracted note heads.

14. The apparatus as claimed in claim 13, wherein said processor unit is further configured to extract, from the image of the musical score, a musical symbol including at least one of a staff notation, a clef and an accidental and estimate the respective pitches of the notes by use of the extracted musical symbol.

15. The apparatus as claimed in claim 12, wherein said processor unit is further configured to partly estimate note values of the individual notes based on types of the extracted note heads.

16. The apparatus as claimed in claim 11, wherein the image note sequence comprises the time series of vector data each indicating, per pitch, present/absence of a note in a same time segment in the image of the musical score, and the logical note sequence comprises the time series of vector data each indicating, per pitch, present/absence of a note in a same time segment graspable from the logical musical score data.

17. The apparatus as claimed in claim 11, which further comprises:

a display device that displays the image of the musical score of the given music piece based on the musical score image data; and said processor unit is further configured to control a display state of the image of the musical score, displayed on said display device, by use of the correspondence relationship.

18. The apparatus as claimed in claim 17, which further comprises:

a reproduction device that reproduces the given music piece based on the logical musical score data; and said processor unit is further configured to control a display state of the musical score, displayed on said display device, in accordance with a current reproduced position of the given music piece.

19. The apparatus as claimed in claim 17, wherein said processor unit is further configured to change the musical score image data in accordance with the correspondence relationship and based on any of data included in the logical musical score data.

20. The apparatus as claimed in claim 17, wherein said processor unit is further configured to:

edit the logical musical score data; and change the musical score image data in accordance with the correspondence relationship and the editing of the logical musical score data.

21. A non-transitory computer-readable storage medium containing a group of instructions executable by a processor unit for performing a method for analyzing a musical score based on musical score image data representing an image of a musical score of a given music piece and logical musical score data logically representing the musical score of the given music piece, the method comprising:

identifying, based on the musical score image data of a first type file, an image note sequence that is a time series of a plurality of notes included in the image of the musical score of the given music piece;

identifying, based on the logical musical score data of a second type file different from the first type file, a logical note sequence that is a time series of a plurality of notes included in the musical score of the given music piece; and generating musical score analysis data defining a correspondence relationship between individual ones of the notes in the image note sequence and individual ones of the notes in the logical note sequence by comparing the image note sequence and the logical note sequence, wherein said comparing the image note sequence and the logical note sequence compares a time series of vector data of the image note sequence and a time series of vector data of the logical note sequence.

* * * * *